US006972067B1

(12) United States Patent
Klenk

(10) Patent No.: US 6,972,067 B1
(45) Date of Patent: Dec. 6, 2005

(54) SYSTEM AND METHOD FOR AUTOMATED PLACEMENT OF PRE-PRINTED SHEETS ONTO A WEB

(75) Inventor: Karl-Michael Klenk, Mesa, AZ (US)

(73) Assignee: SmartHealth, Inc., Phoeniz, AZ (US)

(*) Notice: Subject to any disclaimer, the term of this patent is extended or adjusted under 35 U.S.C. 154(b) by 242 days.

(21) Appl. No.: 10/317,760

(22) Filed: Dec. 12, 2002

(51) Int. Cl.[7] ............................................... B32B 31/00
(52) U.S. Cl. ...................... 156/269; 156/285; 156/353; 156/522; 156/570
(58) Field of Search ................................ 156/250, 269, 156/285, 510, 522, 556, 569, 570, 571, 572, 156/64, 353, 354, 355

(56) References Cited

U.S. PATENT DOCUMENTS 3,255,067 A * 6/1966 Sontheim et al. ........... 156/522
3,909,342 A * 9/1975 Shook ........................ 156/522
4,594,125 A * 6/1986 Watson ....................... 156/516
4,838,985 A * 6/1989 Karagiannis ................ 156/522
4,882,004 A * 11/1989 Watson ....................... 156/381
6,234,230 B1 * 5/2001 Petitjean ..................... 156/522
6,508,904 B1 * 1/2003 Charley ...................... 156/249

* cited by examiner

*Primary Examiner*—James Sells
(74) *Attorney, Agent, or Firm*—Reinhart Boerner Van Deuren s.c.

(57) ABSTRACT

A system and method for producing flexible magnets includes apparatus for automatically feeding a plurality of individual, pre-printed sheets into continuous webs of a magnet material and a laminate to laminate the individual sheets to the web of magnet material in a continuous process. The laminated magnet material is then advanced to a cutting mechanism that cuts the magnet material into a plurality of individual flexible magnets. A registration sensor indexes each of the individual pre-printed sheets on the magnet material to the cutting mechanism.

16 Claims, 4 Drawing Sheets

SYSTEM AND METHOD FOR AUTOMATED PLACEMENT OF PRE-PRINTED SHEETS ONTO A WEB

BACKGROUND OF THE INVENTION

Field of the Invention

The present invention relates generally to systems and methods for producing a laminated product, and more particularly to a system and method for producing a laminated magnet product using a continuous web process wherein individual, pre-printed sheets are introduced into a moving web with rolls of a flexible magnet material and a laminate.

Small flexible magnets with information printed thereon, frequently referred to as "refrigerator magnets" are popular as a way to hold items on a home refrigerator and as a way to advertise. The flexible magnets can be produced in several ways. In one known system, the sheets of magnet material are pre-laminated with a silk-screenable surface. Then, the sheets of magnet material are screen-printed, one color at a time, to produce an image on the sheet of magnet material. The printed sheets are then transferred to a die cutting function that cuts each of the sheets into individual magnets in a separate operation. One shortcoming of this system is the need to provide several processing operations, manually moving the product from one operation to another in the manufacturing process. In addition, because of the need to prepare plates for producing the multicolor images on the magnetic material, this system typically requires three weeks or more weeks to set up for a production run.

In another known system, images are printed on sheets of paper or synthetic material using a traditional offset or electronic press. A separate operation is then used to laminate the printed paper or synthetic material onto a sheet of magnet material. A third operation is used to die cut the sheets of magnet material into individual magnets. In the die cutting process, typically, a die is visually aligned over the laminated sheet of magnet material and a press is activated to apply sufficient pressure to the die to cut the individual magnets for the laminated sheet. As for the previously described system, this system requires multiple processing operations and moving of the product from one operation to the next in the manufacturing process. Another shortcoming is the need to use visual alignment to register each sheet with the die cutter during production. This not only slows the manufacturing process, but also is subject to operator error.

In a further system, a web of pre-laminated magnet material on paper or synthetic material is fed from a roll of the material into a digital or offset web press for printing. The web is then cut into master sheets which are conveyed to a die cutter for the cutting of the individual magnets from the master sheet. This system when using offset printing typically requires three weeks or more weeks to set up for a production run because of the need to prepare plates for producing the multicolor images on the magnetic material. Thus, the system does not provide rapid turn around, time. Moreover, this system does not lend itself to the processing of small quantities of the flexible magnets. This system when using digital printing is characterized by material and quality limitations.

It is, accordingly, one objective of the present invention to provide an improved system and method for producing a laminated product.

It is another objective of the present invention to provide a system and method for producing a laminated product using a continuous web process wherein pre-printed sheets are introduced into a moving web with rolls of a base material and a laminate.

A further objective of the present invention is to provide a system and method for producing an information bearing laminated flexible magnet using a continuous web process wherein pre-printed sheets are introduced into a moving web with rolls of a flexible magnet material and a laminate.

Another objective of the present invention is to provide an improved system and method for providing printed information on a magnet material.

Yet another objective of the present invention is to provide a system and method for providing a laminated product having an improved quality.

A further objective of the present invention is to provide a system and method having the capability of producing small quantities of laminated product using an automated continuous web process.

SUMMARY OF THE INVENTION

The disadvantages and limitations of the background art discussed above are overcome by the present invention. With this invention, there is provided a system and method for producing a laminated product using a continuous web process wherein pre-printed sheets are introduced into a web with rolls of a base material and a laminate for laminating the pre-printed sheets to the base material.

In accordance with the invention, there is provided a system including apparatus for automatically feeding a plurality of individual, pre-printed sheets into a continuous web with rolls of a base material and laminate. The system provides for laminating the individual pre-printed sheets to the base material in a continuous process with the base material then being advanced to a cutting mechanism for cutting the base material into a plurality of individual laminated products. In one embodiment, the system further includes a registration sensor that indexes each of the individual pre-printed sheets that have been laminated onto the base material to the cutting mechanism. In one embodiment, the registration sensor comprises an optical sensor that detects index marks on the individual pre-printed sheets.

In one embodiment, the base material is a flexible magnet material and the laminated product is cut to produce a plurality of information bearing flexible magnets. The magnet material and the laminate are continuous webs and the plurality of individual, pre-printed, sheets are introduced into the continuous webs of magnet material and laminate for laminating the sheets onto the magnet material.

In accordance with another aspect of the invention, there is provided a method for producing laminated flexible magnets. According to the method, individual pre-printed sheets are automatically fed into a web of flexible magnet material and laminate material in a continuous process with the web of magnet material then continuing to a cutting station where the web of the magnet material is cut into individual magnets. The individual sheets that have been laminated onto the web of magnet material are indexed to the cutting mechanism by index marks printed on each individual sheet.

DESCRIPTION OF THE DRAWINGS

These and other advantages of the present invention are best understood with reference to the drawings, in which.

DETAILED DESCRIPTION OF THE PREFERRED EMBODIMENT

The system and method according to the present invention produce a laminated, information bearing product by feeding individual sheets, pre-printed with the information, into a web with rolls of a base material and a laminate, laminating the pre-printed sheets to the base material, and then cutting the portions of the base material containing the pre-printed sheets to the desired size and shape. The system and method are described with reference to an application for producing flexible magnets that have printed information thereon, a product commonly referred to as "refrigerator magnets". However, the system and method can be used for producing other items, such as stickers, business cards, labels, die cut cards, and the like. The pre-printed sheets that are applied to the base material can be any item that can be produced by printing on a sheet of paper.

Figure 1:
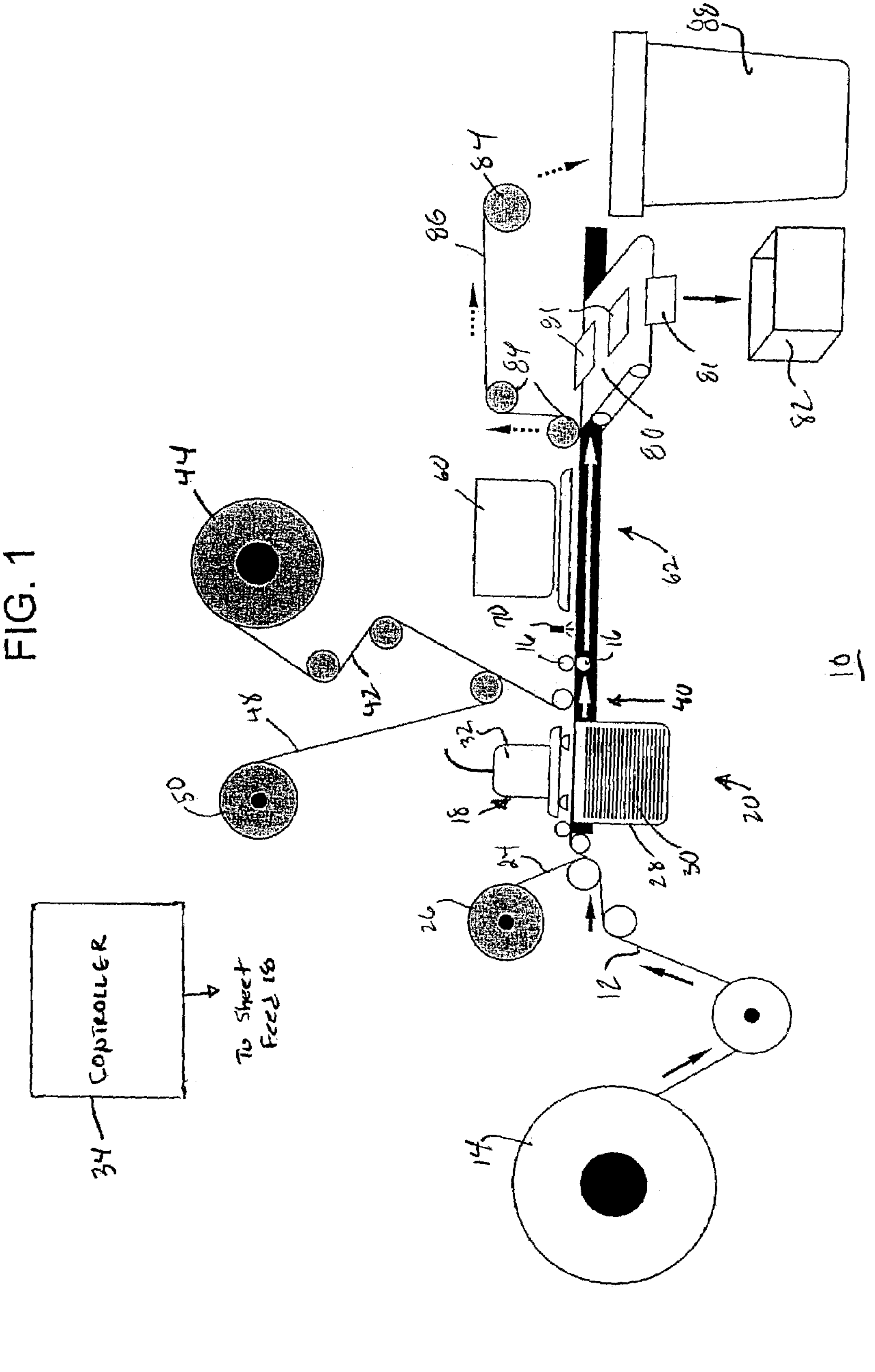
FIG. 1 is a side view of a system for producing laminated magnets in accordance with the invention.
Figure 2:
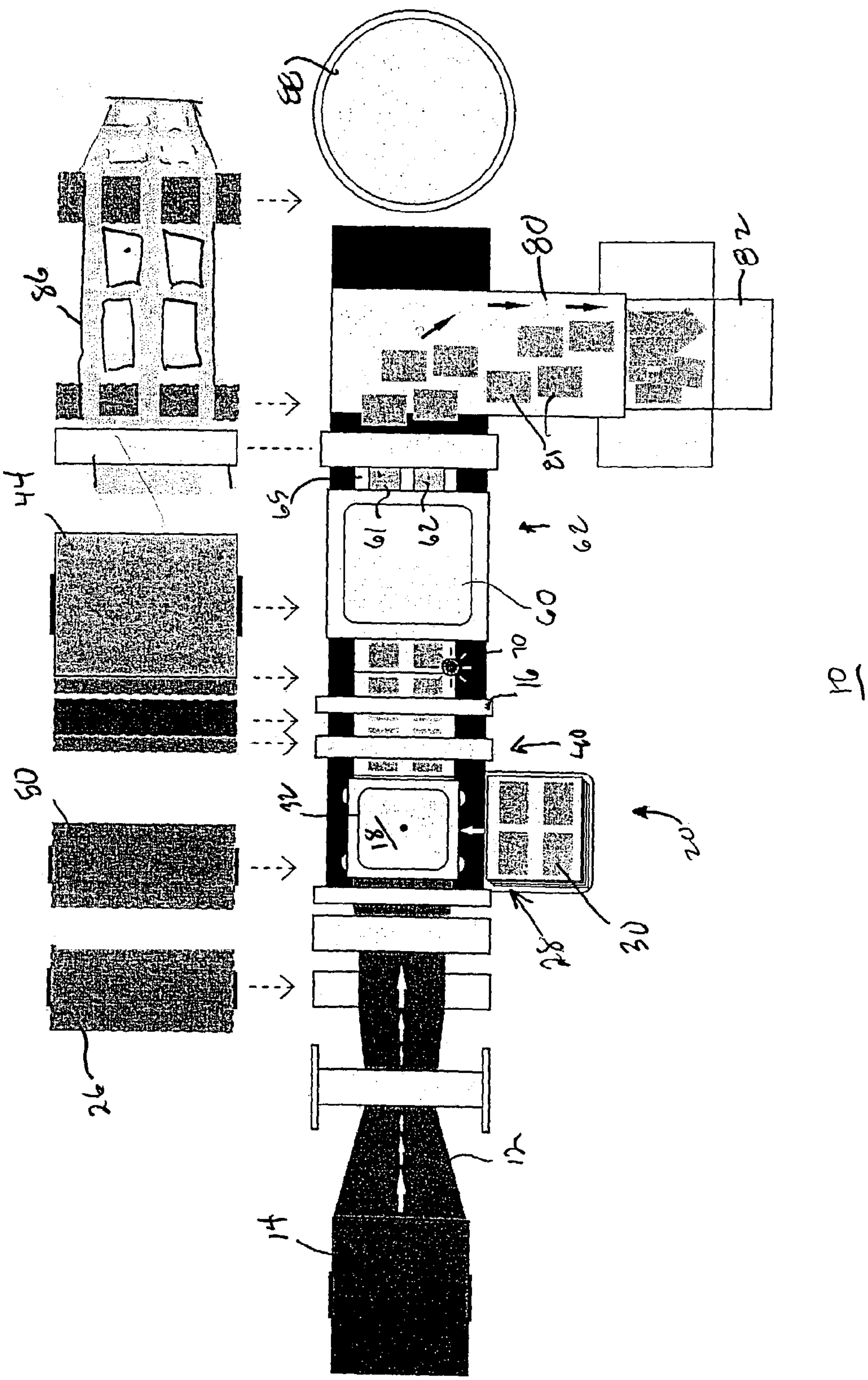
FIG. 2 is a top view of the system shown in FIG. 1.

Referring to FIGS. 1 and 2, there is shown a system 10 for producing flexible magnets having printed information thereon using a continuous web process. By a continuous web process is meant that the steps of introducing a plurality of individual, pre-printed sheets onto the continuous web of base material, laminating the pre-printed sheets onto the web of base material and cutting of individual magnets are carried out as the web of base material is advanced through the apparatus as will be described.

In the system 10, a continuous web 12 of magnet material is drawn from a supply roll 14 of magnet material and advanced by a pair of drive rollers 16 past a pre-printed sheet feed apparatus 18 at a sheet feed station 20. The drive rollers 16 advance the web 12 of magnet material through the apparatus at a substantially constant speed. In one embodiment, the magnet material is a 0.025 inch flexible magnetic material having a pressure sensitive adhesive material on the upper surface thereof, protected by a cover layer 24. One magnet material suitable for this application is commercially available from FLEXMAG Industries, Marietta, Ohio 45750.

Figure 3:
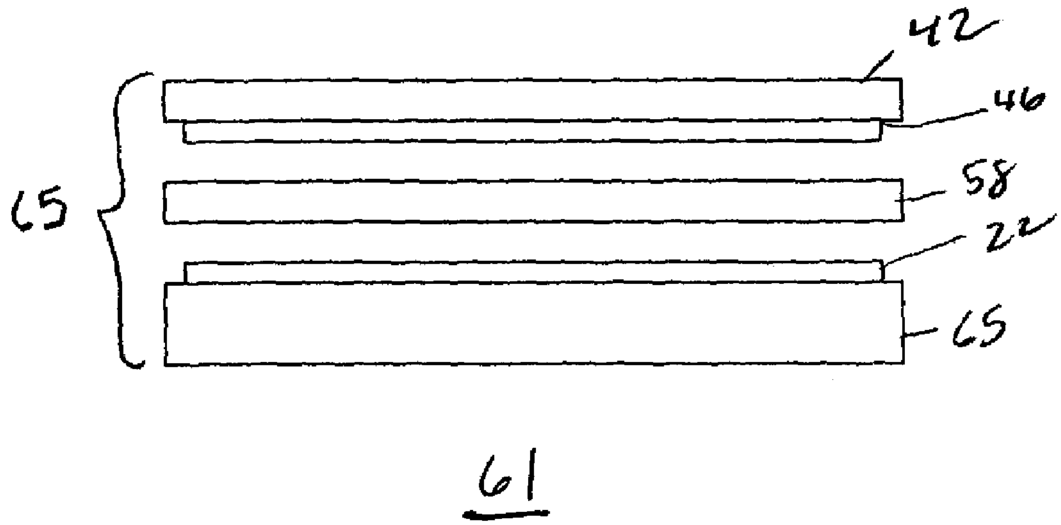
FIG. 3 is an exploded view of a laminated magnet produced by the system of FIG. 1.

As the web 12 of magnet material is advanced, a strip off roller 26 removes the cover layer 24 at the input side of the sheet feed apparatus 18 to expose the adhesive material on the web 12 of magnet material. The adhesive material 22 is shown in the exploded view, FIG. 3, of flexible magnet 61.

The sheet feed apparatus 18 includes a hopper 28 that holds a stack 30 of pre-printed sheets. The hopper 28 is located adjacent to the web 12. In one embodiment, the sheet feed apparatus 18 includes a vacuum transfer mechanism that is adapted to lift the sheets off of the stack 30, one at a time, move the sheets into an overlying relation with the web 12 of magnet material, and then place the sheets onto the web 12. In one embodiment, the vacuum transfer mechanism includes a vacuum head 32 movable between a sheet pick-up position (not shown), in which the vacuum head 32 overlies and is in alignment with the stack 30 of pre-printed sheets in the hopper 28, and a sheet release position, shown in FIG. 2, in which the vacuum head 32 overlies the web 12 of magnet material, centered over the web 12 as shown in FIG. 2. The vacuum head 32 controlled to produce a suction for "grabbing" the topmost sheet in the stack 30 when the vacuum head 32 is in the sheet pick-up position, and to release the suction when moved to the sheet release position, placing the transferred sheet onto the web 12 of magnet material.

Figure 4:
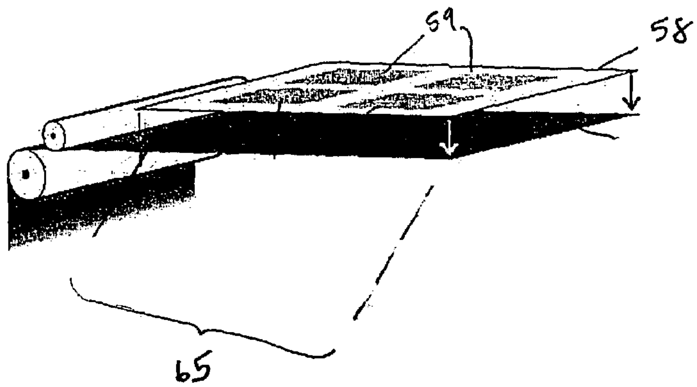
FIG. 4 is a simplified showing of how a pre-printed paper sheet is placed on a portion of an adhesive coated web of magnet material in producing laminated magnets using the system of FIG. 1.
Figure 5:
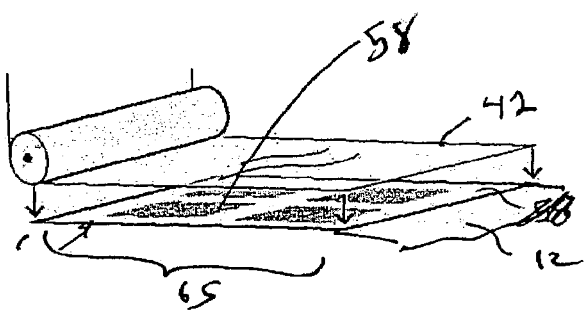
FIG. 5 is a simplified showing of how laminate is applied to the web portion of FIG. 4 in producing laminated magnets using the system of FIG. 1.

Referring also to FIG. 4, a pre-printed sheet 58 bearing an information and/or indicia containing portion, indicated generally at 59, is shown supported by the vacuum head 32 (not shown in FIG. 4) in overlying relation with a portion of the web 12 that will be covered by the individual sheet 58, defining a web section 65 shown in FIG. 5. In FIG. 5, the pre-printed sheet 58 is shown disposed on a portion of the upper surface of the web 12, defining the web section 65. The sheet feed apparatus 18 includes a drive mechanism for moving the vacuum head 32 between the sheet pick-up and sheet release positions. The vacuum head 32 is moved linearly (and vertically up and down) with respect to the web 12 of magnet material in moving between the sheet pick up and sheet release positions. The vacuum head 32 releases the sheet of pre-printed material onto the continuous web 12 of magnet material as the web of magnet material is halted momentarily during a cutting operation being performed downstream by a cutting mechanism 60. The vacuum transfer mechanism can be operated under the control of a process controller 34 (FIG. 1) that synchronizes the operation of the vacuum transfer mechanism, with the advancement to the web 12 of magnet material (and the laminate 42) with the cutting operation performed by the cutting mechanism 60. The drive mechanism momentarily halts advancement of the web of magnet material 12 during the cutting operation. The individual, pre-printed sheets are placed on the web of magnet material while advancement of the web is halted during the cutting operation.

The sheet feed apparatus 18 transfers sheets 28 of pre-printed stock from the supply hopper 30 onto the moving web 12 of magnet material. In one embodiment, the pre-printed paper sheets can be a 0.010 inch Teslin synthetic material. One such paper suitable for this application is commercially available from PPG Pittsburgh, Pa. 15272.

Figure 6:
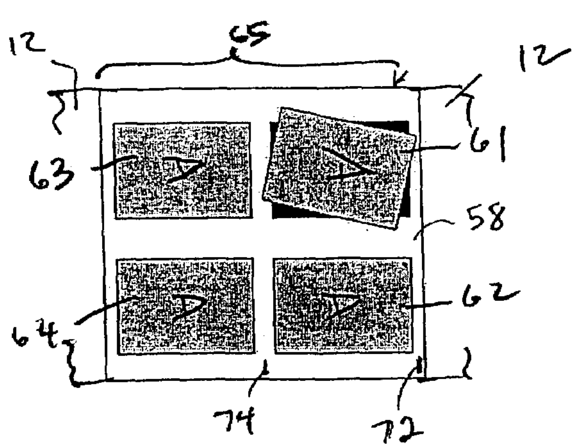
FIG. 6 is a simplified showing of how the laminated web portion of FIG. 5 is cut into a plurality of individual magnets.

The information or indicia printed on the sheets in the area 59 can be anything and is represented by the letter "A" on the magnets 61–64 in FIG. 6. It is apparent that for a given magnet, such as magnet 61, the area 59 is sized to cover the entire upper surface of the magnet 61 when the magnet 61 is cut from the web 12. The information can be produced on the sheets of paper or synthetic material using an electronic offset process. These individual sheets are automatically fed onto the continuous web 12 of magnet material. This allows the lamination of the individual pre-printed sheets onto the web of magnet material to be carried out using a continuous web process. The printing of the individual sheets in the stack of sheets 30 is done independently of the laminating process. Any number or dimension of sheets can be used and it is an easy matter to modify production runs to change the printed matter being applied to magnets that are being produced. Such change is merely requires changing the stack 30 of pre-printed paper sheets contained in the hopper 28. Thus, pre-printed sheets can be created or existing additional stock of previously pre-printed sheets as needed and independently of the laminating process.

Referring to FIGS. 1, 2, 3 and 5, the pre-printed paper sheet, such as sheet 58 shown in FIG. 5, is laminated to the web portion 65 at a laminating station 40 with a laminate material 42 that is fed from a laminate supply roll 44. The laminate material 42 is drawn from the laminate supply roll 44 and advanced by the drive rollers 16 onto the pre-printed paper sheet deposited on the web 12 of magnet material. The laminate material includes an adhesive bearing surface protected by a cover layer 48 that is stripped off by stripping roller 50 (the adhesive 46 being shown, for example, in the exploded view of magnet 61 in FIG. 3) as the laminate material 42 is advanced by the drive rollers 16. In one embodiment, the laminate material 42 can be a 0.002 inch polypropylene over laminate having a cold set adhesive. One material suitable for this application is commercially available from FLEXCON, Spencer, Mass. 01562.

Referring to FIGS. 1, 2 and 6, the laminated web is then advanced to a cutting mechanism 60 to position a laminated web section, such as web section 65 at a cutting station 62. In one embodiment, the cutting mechanism 60 is a die cutter that cuts individual magnets, such as magnets 61–64 shown in FIG. 6, from the web section 65 of the web 12 of magnet material. In one embodiment, the maximum sheet size before cutting is 4¾ by 7½, and the maximum cut is 4¼ by 7¼. In the illustrated embodiment, each pre-printed sheet, such as sheet 58, contains four identical patterns 59 and the web portion 65 of the laminated web 12 of material that contains the pre-printed sheet 58 is cut to produce the four individual magnets 61–64. However, fewer or more magnets can be cut from the web section. Moreover, the patterns or configurations imprinted on the magnets can be the same or different. In one embodiment, the magnets are cut from the web 12 using interchangeable steel dies to allow variation in the size and shapes of the individual magnets being produced. The apparatus is set up in accordance with number of individual magnets to be cut for a web section 65 and the pattern pre-printed on the sheet.

Referring to FIGS. 1 and 6, preferably, the system 10 includes a registration sensor 70 that is located adjacent at the input of the cutting mechanism 60 for indexing each individual sheet that has been laminated onto the web of magnet material to cutting die of the cutting mechanism 60. In one embodiment, the registration sensor includes an optical sensor that detects index marks 72 and 74 that are printed on each individual sheet. In the embodiment illustrated, the index marks 72 and 74 define the two rows of magnets 61, 62 and 63, 64 that are to be cut from the web section 65.

Referring again to FIGS. 1 and 2, the system 10 can include an off-conveyor 80 receives the individual magnets, such as magnets 81, as they are cut from the web 12 of magnet material. The off-conveyor 80 transports the individual magnets 81 to a suitable product container 82. The system 10 can include guide rollers 84 to direct the waste material 86 (shown in the upper portion of FIG. 2) to a waste container 88.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A system for producing flexible magnets from a continuous web of a base material in a continuous process, said system comprising:

a source of a continuous web of a base material, the base material including a flexible magnet material;

a source of a plurality of individual, pre-printed sheets, wherein the preprinted sheets include an index mark;

a drive mechanism for advancing the web of base material past the source of individual, pre-printed sheets;

a transfer mechanism for transferring the individual, pre-printed sheets, one at a time, to the web of base material as the web of base material is advanced past the source of pre-printed sheets;

a source of a laminate, the drive mechanism advancing the web of base material including the pre-printed sheets past the source of laminate for introducing the laminate in overlying relation with the individual, pre-printed sheets transferred thereto to laminate the pre-printed sheets to the web of base material;

a cutting mechanism for cutting flexible magnets from the laminated base material during cutting operations, the drive mechanism advancing the laminated web of base material to the cutting mechanism and momentarily halting advancement of the web of base material during the cutting operations, and wherein the individual, pre-printed sheets are placed on the web of base material while advancement of the web of base material is halted during the cutting operations; and a registration sensor for detecting the index mark for indexing the pre-printed sheets carried by the web of base material with the cutting mechanism prior to cutting the flexible magnets from the web of base material.

2. The system according to claim 1, and further including an off-conveyor for conveying the laminated products away from the cutting mechanism.

3. A system for producing flexible magnets from a continuous web of a flexible magnet material in a continuous process, said system comprising:

a source of a continuous web of the flexible magnet material;

a source of a plurality of individual, pre-printed sheets;

a drive mechanism for advancing the web of magnet material past the source of the individual, pre-printed sheets;

a transfer mechanism for transferring the individual, pre-printed sheets, one at a time, to the web of magnet material as the web of magnet material is advanced past the source of the individual, pre-printed sheets;

a source of a laminate, the drive mechanism advancing the web of magnet material past the source of laminate for introducing the laminate onto the web of magnet material in overlying relation with the individual, pre-printed sheets transferred thereto to laminate the pre-printed sheets to the web of magnet material; and a cutting mechanism for cutting individual magnets from the web of magnet material during cutting operations, the drive mechanism advancing the web of magnet material to the cutting mechanism and momentarily halting advancement of the web of magnet material during the cutting operations, and wherein the individual, pre-printed sheets are placed on the web of magnet material while advancement of the web is halted during the cutting operations.

4. The system according to claim 3, including a controller for controlling the drive mechanism to synchronize the operation of the transfer mechanism and the cutting mechanism with the advancement of the web of magnet material.

5. The system according to claim 3, wherein the transfer mechanism includes a vacuum transfer mechanism.

6. The system according to claim 3, and further including a registration sensor for indexing the pre-printed sheets laminated onto the web of magnet material with the cutting mechanism prior to cutting the individual magnets from the web of magnet material.

7. The system according to claim 3, wherein the individual sheets are pre-printed with advertising information.

8. The system according to claim 3, and further including an off-conveyor for conveying the individual laminated flexible magnets away from the cutting mechanism.

9. A method for producing a laminated product, said method comprising the steps of:

providing a stack of individual, pre-printed sheets;

advancing a web of a base material past the stack of pre-printed sheets, the base material including a flexible magnet material;

transferring the individual, pre-printed sheets to the base material as the web is advanced past the stack of sheets;

advancing the web of base material including the pre-printed sheets to a laminating station and laminating each of the pre-printed sheets to the base material to form laminated web portions;

advancing the web of base material including the laminated web portions to a cutting mechanism and cutting at least one laminated flexible magnet product from at least one of the laminated web portions during a cutting operation; and momentarily halting advancement of the web of base material during cutting operations, wherein the individual, pre-printed sheets are placed on the web of base material while advancement of the web of base material is halted during the cutting operations.

10. The method according to claim 9, wherein the step of transferring the pre-printed sheets includes the step of using a vacuum transfer apparatus to transfer the individual, pre-printed sheets from the stack of pre-printed sheets to the web of base material.

11. The method according to claim 10, wherein the step of using a vacuum transfer apparatus includes placing the individual, pre-printed sheets onto the web of base material.

12. The method according to claim 9, further including the step of indexing the pre-printed sheets that have been laminated onto the base material with the cutting mechanism prior to cutting a laminated product from the laminated web portions.

13. A method for producing laminated flexible magnets, said method comprising the steps of:

providing a stack of individual, pre-printed sheets;

advancing a web of a flexible magnet material past the stack of individual, pre-printed sheets;

transferring the individual, pre-printed sheets to the web of magnet material as the web of magnet material is advanced past the stack of individual, pre-printed sheets;

advancing the web of base material including the pre-printed sheets to a laminating station and laminating each of the individual, pre-printed sheets to the web of magnet material to form laminated web portions;

advancing the laminated web portions web of base material including the laminated web portions to a cutting mechanism and cutting at least one laminated flexible magnet from at least one of the laminated web portions during a cutting operation; and momentarily halting advancement of the web of magnet material during the cutting operations, wherein the pre-printed sheets are transferred onto the web of magnet material while advancement of the web of magnet material is halted during the cutting operations.

14. The method for producing laminated flexible magnets according to claim 13, wherein the step of transferring the individual, pre-printed sheets includes the step of using a vacuum transfer apparatus to transfer the individual, pre-printed sheets from the stack of pre-printed sheets to the web of magnet material.

15. The method for producing laminated flexible magnets according to claim 14, wherein the transferring step includes placing the individual, pre-printed sheets on the web of magnet material.

16. The method for producing laminated flexible magnets according to claim 13, further including the step of indexing each of the individual, pre-printed sheets that have been laminated onto the web of magnet material with the cutting mechanism prior to cutting laminated flexible magnets from the laminated web portions.

* * * * *